April 12, 1949.　　　　S. BAYLIN　　　　2,466,759
ROTARY POWER UNIT
Filed Nov. 6, 1944　　　　　　　　　　　3 Sheets-Sheet 1

INVENTOR
Samuel Baylin
by E.N. Featherstonhaugh
ATTORNEYS

April 12, 1949.       S. BAYLIN       2,466,759
ROTARY POWER UNIT
Filed Nov. 6, 1944       3 Sheets-Sheet 2
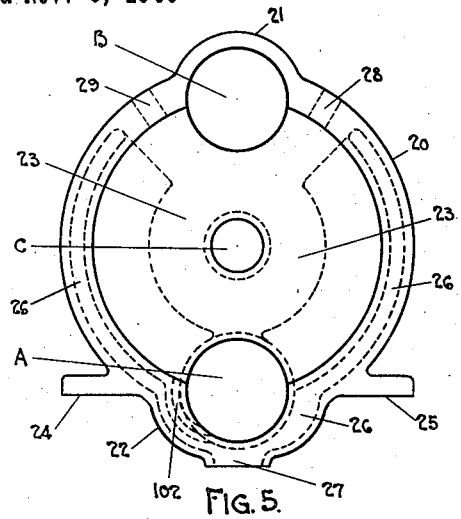
FIG. 5.
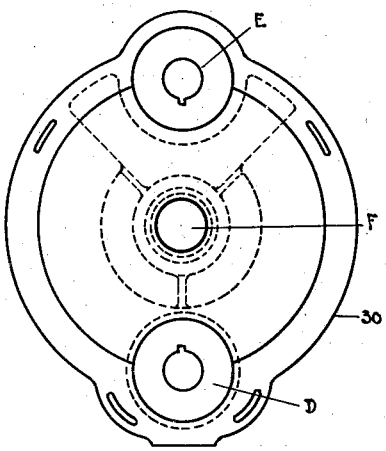
FIG. 6.
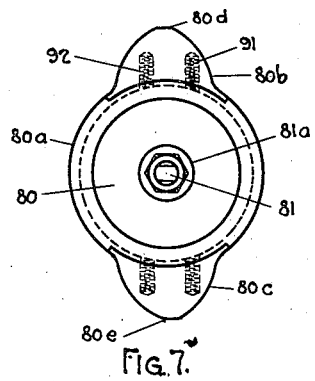
FIG. 7.
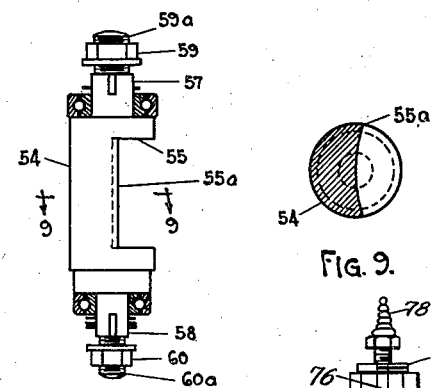
FIG. 8.   FIG. 9.
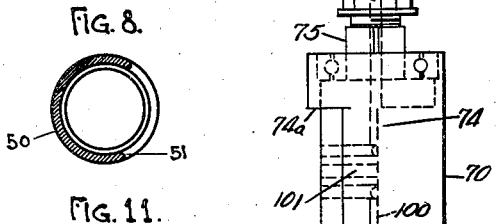
FIG. 10.   FIG. 11.
FIG. 15.
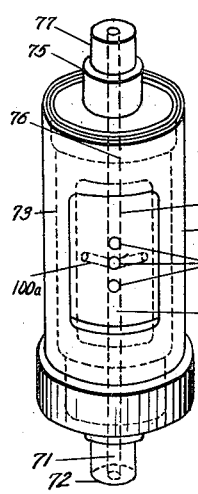
FIG. 16.
INVENTOR
Samuel Baylin
BY E. M. Fetherstonhaugh
ATTORNEYS April 12, 1949.  S. BAYLIN  2,466,759
ROTARY POWER UNIT
Filed Nov. 6, 1944  3 Sheets-Sheet 3
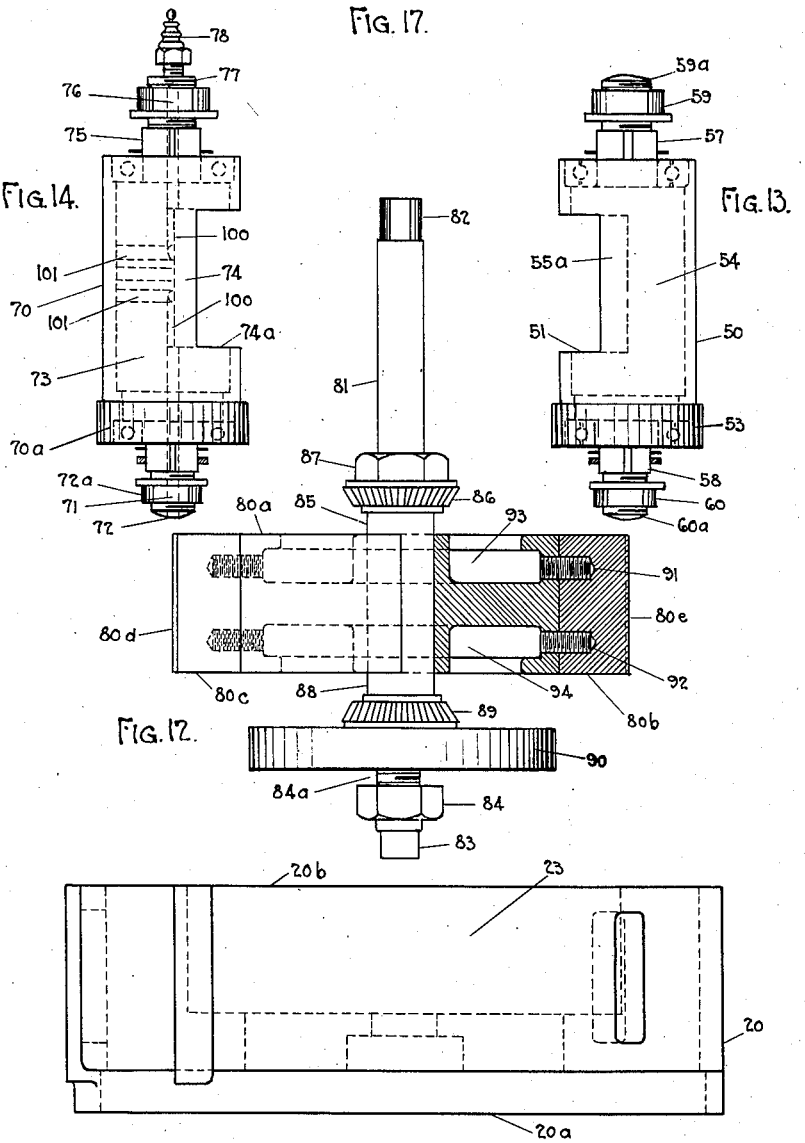
INVENTOR
Samuel Baylin
BY E. N. Featherstonhaugh
ATTORNEYS Patented Apr. 12, 1949

2,466,759

UNITED STATES PATENT OFFICE 2,466,759

ROTARY POWER UNIT

Samuel Baylin, Montreal, Quebec, Canada

Application November 6, 1944, Serial No. 562,214

3 Claims. (Cl. 123—13)

The invention relates to improvements in rotary power units as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a rotary power unit which may be capable of creating mechanical energy in order to drive or set in motion any suitable appliance or machine connected or attached to it; to devise a power unit which may be adaptable to or used in connection with any mobile carriage, aeroplane, boat, car, or other transportation vehicle; to construct a power unit which may be capable of operating, or a power unit which may supply the necessary mechanical energy to so operate, any stationary mechanisms, such as pumps, lathes, drills, mills, compressors, motors, transformers, generators, or other machinery; to build a mechanism to create mechanical energy which may be operated by means of internal combustion and which may be easily and simply converted so as to be operated by means of compressed air or steam; to devise a mechanism to create mechanical energy which may be readily converted into a mechanism driven by an outside force so as to be used as a pump, turbine, or compressor; to furnish a power unit which may be operated with a minimum consumption of fuel; to devise a power unit which will be easy to operate, transported with facility and readily adaptable for use with other machinery; and generally to provide a rotary power unit that will be durable in construction, of comparatively simple parts and efficient for its purpose.

In the drawings:

Figure 5 is an end view of the inside of the cylinder.

Figure 6 is an end view of the inside of the cylinder head.

Figure 7 is an end view of the driving rotor piston assembly.

Figure 8 is a side sectional view of a gate rotor axle shaft.

Figure 9 is a cross sectional view as taken on the lines 9—9 in Figure 8.

Figure 10 is a side elevation of a rotor casing.

Figure 11 is a cross sectional view of a rotor casing taken on the lines 11—11 in Figure 10.

Figure 12 is a side sectional view of a driving rotor piston and shaft assembly.

Figure 13 is a side elevation of a gate rotor assembly.

Figure 14 is a side elevation of a combustion rotor assembly in an open position.

Figure 15 is a side elevation of a combustion rotor assembly in a closed position.

Figure 16 is a side elevation of a combustion rotor axle shaft showing by-pass holes on the concave plane surface.

Figure 17 is a side elevation of a cylinder head.

Figure 18 is a side elevation of a cylinder.

Like numerals of reference indicate corresponding parts in the various figures.

The rotary power unit as hereinafter described and illustrated in the accompanying drawings, is in the form of a rotary motor of the expansible type, but it is of course understood that modifications and ramifications in the unit may be made and used for other purposes without departing from the essential features of this invention.

Figure 1:
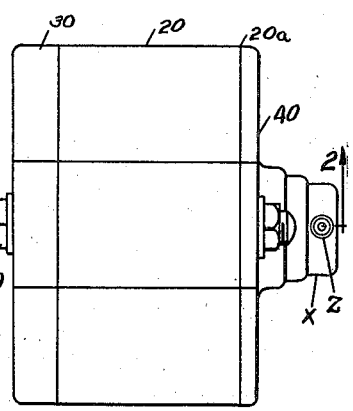
Figure 1 is a plan elevation of the rotary power unit.

Referring to the drawings, the cylinder 20, or casing, of the rotary power unit, housing its primary mechanical parts, is made from an acceptable type of metal, and is shaped in a cylindrical form departing from a circle shape at one side 21 and at the opposite side 22, so as to form a bulge or cone in the circumference of the cylinder 20, which bulges or cones, 21 and 22, form an enlargement to the interior space of inside chamber 23, which inside chamber 23, has a channel 102 leading towards bulge 22, and back of space occupied by combustion rotor assembly 70, the cylinder 20, is also provided with two outside flanges 24 and 25 which act as supports to the cylinder 20, so as to keep the unit secured and in an upright position between two acceptable supporting bars. The base of the cylinder 20a, is fitted with holes A, B and C, to receive and enable to be held fast, one end of the combustion rotor assembly 70, the gate rotor assembly 50, and the driving rotor assembly 80, respectively. The walls of the cylinder 20, are formed with a hollow space 26, which furnishes a water cooling chamber, the water finding entrance to the water cooling chamber 26 by means of a hole or bore 27, into which orifice 27, any acceptable water hose connection may be adjusted leading from any acceptable type of water reservoir or tank. To one side of the bulge or cone 21, a hole 28 leads through the cylinder 20 to the inside chamber 23 (Figures 3 and 5) constituting an air inlet; in like manner, at the other side of the bulge or cone 21 of the cylinder 20, a hole 29 leads through the cylinder 20, to inside chamber 23, constituting an exhaust outlet (see Figures 3 and 5). The cylinder 20 being formed by its walls and a base or bottom 20a (see Figures 1, 2, and 18), and being open at the opposite side 20b, has a cover, or cylinder head 30 (see Figures 6 and 17), of a circular shape corresponding to the outline of the cylinder 20, so as to fit as a cover. This cylinder head 30, is fitted with holes D, E, F, to receive and hold fast the extremities of the combustion rotor assembly 70, gate rotor assembly 50, and driving shaft 81, of the driving rotor assembly 80. In addition, an auxiliary protective cover 40 is affixed to base 20a, as a protection to the intermeshing gears 53, 90, 70a and is suitably secured to the cylinder. To this protective cover 40 are attached in an acceptable manner, an acceptable type of fuel pump x, an acceptable type of electrical ignition Y, and acceptable type of fuel inlet z.

The three chief operating mechanisms of the power unit are firstly (see Figure 13), the gate rotor assembly 50, and secondly the combustion rotor assembly 70 (see Figure 14), and thirdly the driving rotor piston assembly 80 (see Figure 12).

Figure 2:
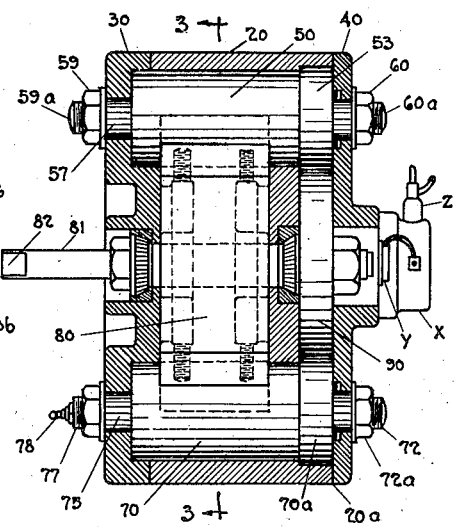
Figure 2 is a side sectional view of the rotary power unit taken on the line 2—2 of Figure 1.

The gate rotor assembly 50, consists of a hollow metal cylinder casing 50a (see Figure 10) having a crevice or cut out section 51, and is constructed with a collar 52, at the bottom, over which collar 52, a cog-wheel 53, fits tightly (see Figure 13) being held securely by an acceptable type of pin, so that the cog wheel 53 and casing 50a turn conjointly. Fitted inside the rotor assembly casing 50a, is an axle shaft 57, and 58, having an enlarged cylinder shaped shank 54, which has a segment cut away 55, leaving a concave plane surface 55a. The axle shaft 57 and 58 protrudes through end of the casing 50, to form bars which find entrance into the holes B and E, of the cylinder 20 and the cylinder head 30, respectively. The ends of the axle shaft 57 and 58 are threaded 59a and 60a, to receive securing nuts 59 and 60 so that the axle shaft with cut away shank 54, is held rigid, inside the cylinder 20, between the base of the cylinder 20a, and the cylinder head 30, as illustrated in Figure 2, whilst the casing 50 with the cog-wheel 53, are permitted to revolve around the said axle shank 54, guided and assisted in its revolutions by acceptable forms of bearings.

Figure 3:
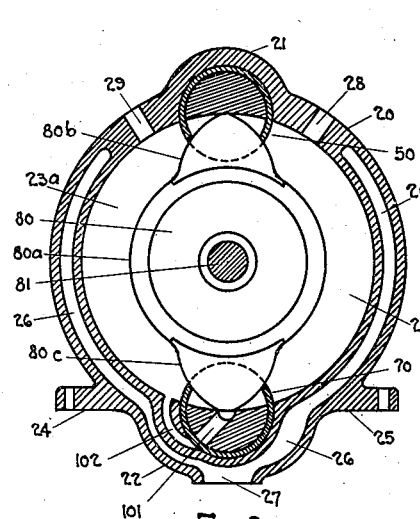
Figure 3 is a cross sectional view as taken on the lines 3—3 in Figure 2, showing piston heads in straight alignment with openings of combustion and gate rotors.
Figure 4:
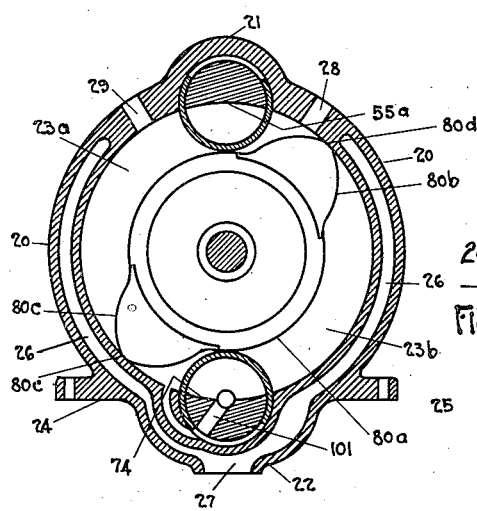
Figure 4 is a cross sectional view as taken on the lines 3—3 in Figure 2, showing piston heads moved out of alignment with the combustion and gate rotors which are illustrated as being closed.

The combustion rotor assembly 70 (Figures 14 and 15), is made in the same manner and form as the gate rotor assembly 50 including a cogwheel 70a, except that in addition there is a bypass or vent 71, extending from the end of the threaded axle 72, of the axle shank 73 (to the inside angle plane surface 74, which by-pass 71 permits the introduction and passage to the concave plane surface 74, of a quantity of combustible liquid; and secondly, there is a vent or bypass 76 extending from the end of the threaded axle 77, of the axle shank 73, through to the inside concave plane surface 74, which vent 76 permits the introduction and passage of an electric spark, produced through the medium of an acceptable type of spark plug 78; and thirdly, the concave plane surface 74 is formed with a groove 100, running lengthwise along the concavity of the concave plane surface 74, leading at one end to the hole 76 and at the other end to the hole 71; midway along this groove 100 are one or more holes 101, leading from the groove 100 directly through the body of the axle shank 73, whilst another groove or depression 100a (see Figure 16), runs at right angles to the groove 100 at the position of the middle vent or by-pass 101; the vents or by-passes 101 are intended to carry the force of any explosion on the face of the concave plane surface 74, (caused by the contact of the electric spark through hole 76 and the combustion fluid through hole 71) through and out to the combustion channel 102 and thence into a section 23a of the inside chamber 23. The inside chamber 23 is always divided into two sections by virtue of the driving rotor assembly 80 with its shoulder projection piston heads 80b and 80c as they revolve inside the chamber 23 of the cylinder 20. In Figures 3 and 4 the combustion section of chamber 23 is indicated by numeral 23a whilst the numeral 23b indicates that section known as the compression chamber.

The driving rotor assembly, Figure 12, consists of a steel driving shaft 81 formed at one end 82 to receive a coupling and formed at the other end 83 threaded 83a with locking nut 84, whilst at its shank an enlargement 85 forms a stop for bearing 86, held in place by a nut 87 threaded and affixed to a corresponding threaded portion of the shaft 81 and the other end of the enlarged shank 88 forms a stop for bearings 89 which are held in place by a gear or cog-wheel 90 which is in turn held in position by the locking nut 84 affixed to the threaded portion 84a of the end of the driving shaft 81 and indicated by numeral 83. Midway on the shank of the shaft 81 indicated by numerals 85—88, the rotary piston body 80a, see Figures 7 and 12, is firmly affixed, the driving shaft 81 passing through a hole 81a, in the center of the rotary piston body 80a, and held solidly in position by an acceptable type of cotter pin, and thus ensures a combined and simultaneous action or revolution. The rotary piston body 80a is formed in the shape of a circle, with the hole 81a in the center, and has adjoined, two rounded shoulder projections 80b and 80c, which form two piston heads, these piston heads being formed semi flat at the tips 80d and 80e. The piston head 80b is firmly joined to the piston body 80a by a plurality of bolts 91 and 92 such bolts 91 and 92 being secured from inside cavities 93 and 94, formed in the rotary piston body 80a. In like manner and corresponding style the piston head 80c is firmly joined to the rotary piston body 80a, and thus forming a complete rotary piston as illustrated in Figure 7, although these piston heads may be cast integral with the piston body if required.

It may be mentioned that a very important feature for the successful carrying out of the operation of the invention is in utilizing the apertures that are formed in the gate and combustion rotors in such a way that the curvatures of the lips which complete the apertures coincide with the curvature of the protuberances or what may be termed the piston heads of the piston body. In this way in the actual rotation of the device, when the piston heads come into engagement with the apertures of the auxiliary rotors the contour of the faces of the protuberances coincide with the contour of the lips that form the apertures thereby completing a seal between the two movable bodies.

In the operation of the invention, the several parts as described are assembled being placed in their relative positions in the cylinder, their positions being governed by the holes in the cylinder and in the cylinder head, the two parts, cylinder and cylinder head being secured together by acceptable type of gasket and bolts, and when so placed, the cog-wheels of the gate rotor assembly, driving rotary assembly and combustion rotor assembly, intermesh with one another, so that they work conjointly and in unison, and are so timed in their revolving action as to permit the piston heads to pass through the open or cut out sections of the gate rotor casing and the combustion rotor casing respectively. When by a continuation of the revolving action the piston head tips leave the openings of the gate rotor casing and combustion rotor casing, the gate rotor casing and combustion rotor casing turning on their inside axle shafts, cause their cut out sections to revolve to the rear, while the solid sections of the casing move around to face the inside of the cylinder, and the concave plane surfaces of the axle shafts maintaining a fixed position, also facing inwards to the inside of the cylinder, now automatically cause to be formed, individual air chambers within their respective rotors.

The action of this reversal of positions of the two rotor casings results in the gate rotor casing now forming a continuance of the wall of the inside of the cylinder, the wall line jutting inwards to meet the circumference of the piston body, so that it divides one end of the cylinder into two sections, whilst the combustion rotor casing performing the same dividing function completes the division of the inside cylinder chamber into two sections, namely, the compression chamber and the combustion chamber. But the position of the combustion rotor casing, the open or cut out facing the rear, away from the inside chamber, causes to be exposed to the combustion chamber channel, the vents or by-passes leading through the body of its axle shaft from the concave plane surface so that any force of air passing through these by-passes will travel through the combustion chamber channels towards the combustion chamber itself. Once the power unit has been set in motion by an acceptable type of self starting device or by a hand crank, and the instant that one of the piston heads has passed through the opening of the combustion rotor casing, and the combustion rotor casing has closed, an explosion takes place inside the chamber of the combustion rotor, caused by an electric spark meeting the combustion fluid, introduced through their respective ports to the chamber formed inside the combustion rotor, and this explosion is so timed that it hits one side of the piston head as the piston head passes the combustion chamber channel, forcing the piston body to revolve and to continue to revolve as long as the electric spark and combustion fluid continue to be supplied. The exhaust hole permits the gases formed by the explosion to pass out of the cylinder while the piston head opposite to the one which received the force of the first explosion passing the inlet port of the cylinder, draws in behind it sufficient air into the compression chamber and continuing to revolve passes through the opening of the combustion rotor casing which is turning automatically to an inside open position to receive it, and once having passed through the opening of the casing receives the force of the next explosion. This causes the piston body attached to the driving rotor shaft to continue to revolve and simultaneously with this second explosion the piston head which received the force of the first explosion passes through the cut out section of the gate rotor and continuing takes its turn in drawing in air through the inlet port to the compression chamber, and automatically comes into position for a third explosion and these consecutive explosions thus automatically cause the piston body to continue to turn or revolve and at the same time turn the driving shaft to which it is attached and thus produce the mechanical energy necessary to drive or set in motion any suitable appliance which may be connected or attached to the said shaft.

By simple and acceptable modified alterations, the combustion chamber of the combustion rotor may be made to receive compressed air or steam instead of an electric spark and combustion fluid, which compressed air or steam, forced into the said combustion rotor and out through the ports into the combustion channel will have the same effect as that of an explosion and will drive and cause to revolve the piston heads as previously described, producing a similar type of mechanical energy necessary to set in motion any suitable appliance which may be connected or attached to the shaft of the driving rotor assembly.

By simple and acceptable alterations, the whole mechanism may be set in operation by the driving rotor shaft being caused to turn by some acceptable type or form of outside energy, such as a driving belt and motor, so that the piston heads would cause water to be drawn into the inside compression chamber through the inlet port, thus constituting the mechanism to function as a pump; and in a similar method to draw air into the inside compression chamber through the inlet port and expel it through the combustion chamber and exhaust port into an air tank so as to compress the air inside the tank and thus constitutes the mechanism as a compressor. In this manner it will be seen that an efficient type of rotary power unit is provided capable of producing unlimited mechanical energy for operating suitable types of mobile and stationary machinery, operated with facility and easy to transport, and providing an economical mechanism which may be adapted to various usages thus assisting to solve many mechanical problems of operations, efficiently adjustable, having all its parts easily accessible for manipulation, adjusting and repairs when necessary.

What I claim is:

1. A power unit comprising a cylindrical casing having a plurality of recesses and intake and exhaust ports, a driving shaft extending through said casing, a rotary piston body secured to said driving shaft, piston heads forming a part of said rotary piston body, combustion and gate rotors journalled in the recesses of said casing and having cut out sections flanked by protruding lips, the curvature of said piston heads and the curvature of said protruding lips coinciding with one another and adapted to complete a seal between the movable bodies at predetermined periods during rotation, a fuel inlet leading into said combustion rotor, said combustion rotor having a channel communicating with said fuel inlet, by-passes communicating with the channel of said combustion rotor and with one of the chambers formed between said casing and said rotary piston body, and means for synchronizing the rotation of said combustion and gate rotors and said rotary piston body.

2. A power unit comprising a cylindrical casing having recesses and creating gate and combustion rotor compartments, a driving shaft, a rotary piston body secured to said driving shaft in said casing, piston heads forming a part of said rotary piston body and projecting outwardly therefrom, an axle extending through each of the recesses of said casing, each of said axles having an arcuate surface so constructed and arranged as to be in alignment and from the continuing curvature of the inner surface of said casing, gate and combustion rotors journalled on the axles in the recesses of said casing and having cut out sections flanked by protruding lips coinciding with one another and adapted to complete a seal between the movable bodies at predetermined periods during rotation, a fuel inlet leading into said combustion rotor, said combustion rotor having a groove communicating with said fuel inlet, by-passes communicating with the groove of said combustion rotor and with one of the chambers formed between said casing and rotary piston body a combustion channel emanating from the enlarged portion containing said combustion rotor and adapted to coincide with the fuel apertures at predetermined periods during the rotation of said combustion rotor, and means for synchronizing the rotation of said combustion and gate rotors and said rotary piston body.

3. A rotary motor of the expansible chamber type comprising a cylindrical casing having enlarged portions around the circumference forming recesses, a driving shaft through said casing and journalled therein, a rotary piston body secured to said driving shaft in said casing, rounded shoulder projections in the shape of piston heads and forming a part of said piston body and having wide bases tapering inwardly from the base and terminating in semi-flat tips, an axle extending transversely through each of the enlarged portions of said casing and having a cylindrical shaped shank provided with a segment cut away to form a concave surface, a gate rotor cylindrically shaped and having an approximately central cut-out section flanked by protruding lips and located in one of the enlarged portions of said casing and journalled on the axle extending therethrough, said gate rotor extending exteriorly of said casing, a combustion rotor having a cut out section flanked by protruding lips and located in the other of the enlarged portions of said casing and journalled on the axle extending therethrough, said gate rotor and said combustion rotor being shaped in such a way that the curvature of their lips which complete the apertures, will coincide with the curvature of said piston heads, a fuel inlet leading into said combustion rotor, said combustion rotor having a groove communicating with said fuel inlet, by-passes communicating with the groove of said combustion rotor and with one of the chambers formed between said casing and rotary piston body, a combustion channel emanating from the enlarged portion containing said combustion rotor and adapted to coincide with the fuel apertures at predetermined periods during the rotation of said combustion rotor, and inter-meshing gears connecting said gate and combustion rotors to said driving shaft.

SAMUEL BAYLIN.

REFERENCES CITED

The following references are of record in the file of this patent:

UNITED STATES PATENTS

| Number | Name | Date |
|---|---|---|
| 958,571 | Wickersham | May 17, 1910 |

FOREIGN PATENTS

| Number | Country | Date |
|---|---|---|
| 16,464 | Great Britain | July 24, 1902 |
| 245,277 | Great Britain | Jan. 7, 1926 |
| 106,385 | Austria | May 10, 1927 |
| 381,625 | Italy | July 15, 1940 |